United States Patent
Freienstein et al.

(10) Patent No.: US 11,827,125 B2
(45) Date of Patent: Nov. 28, 2023

(54) PRE-CRASH SEAT ACTUATOR SYSTEM AND METHOD

(71) Applicant: Robert Bosch GmbH, Stuttgart (DE)

(72) Inventors: Heiko Freienstein, Weil der Stadt (DE); George Marutz, II, Huntington Woods, MI (US); Kevin Orava, Shelby Township, MI (US)

(73) Assignee: Robert Bosch GmbH, Stuttgart (DE)

( * ) Notice: Subject to any disclaimer, the term of this patent is extended or adjusted under 35 U.S.C. 154(b) by 278 days.

(21) Appl. No.: 17/240,615

(22) Filed: Apr. 26, 2021

(65) Prior Publication Data
US 2021/0237622 A1 Aug. 5, 2021

Related U.S. Application Data

(62) Division of application No. 16/336,674, filed as application No. PCT/US2016/058161 on Oct. 21, 2016, now Pat. No. 11,046,208.

(51) Int. Cl.
*B60R 22/00* (2006.01)
*E05F 15/00* (2015.01)
(Continued)

(52) U.S. Cl.
CPC ....... *B60N 2/0276* (2013.01); *B60N 2/02246* (2023.08); *B60R 21/0134* (2013.01);
(Continued)

(58) Field of Classification Search
CPC .......... B60N 2/0276; B60N 2/02246; B60N 2/4279; B60R 21/01554; B60R 21/0134;
(Continued)

(56) References Cited

U.S. PATENT DOCUMENTS 6,915,196 B2 7/2005 Rao et al.
7,387,184 B2 6/2008 Bethge et al.
(Continued)

FOREIGN PATENT DOCUMENTS

EP 0402622 A1 12/1990
EP 1609664 A2 12/2005
EP 2610103 A1 7/2013

OTHER PUBLICATIONS

International Search Report and Written Opinion for Application No. PCT/US2016/058161 dated Jul. 17, 2017 (14 pages).
(Continued)

*Primary Examiner* — Harry Y Oh
(74) *Attorney, Agent, or Firm* — Michael Best & Friedrich LLP

(57) ABSTRACT

A pre-crash seat actuator system for moving a vehicle seat includes an occupant protection control system that determines a collision is imminent and provides a trigger signal and an enable signal. A vehicle seat controller receives the trigger signal and determines a moving the vehicle seat to a desired position to mitigate severity of a collision. In response to the trigger signal, the vehicle seat controller provides a fast mode voltage for moving the vehicle seat in a fast mode. A smart control adapter determines whether the fast mode voltage and the enable signal are both received, to provide the fast mode voltage to a vehicle seat electric drive. In another embodiment, the vehicle seat controller receives the trigger signal and a collision signal to provide fast mode voltage, and the seat is returned to an original position when a crash does not occur.

18 Claims, 10 Drawing Sheets

(51) Int. Cl.
  *G05D 1/00* (2006.01)
  *G05D 3/00* (2006.01)
  *G06F 7/00* (2006.01)
  *G06F 17/00* (2019.01)
  *B60N 2/02* (2006.01)
  *B60R 21/015* (2006.01)
  *B60R 21/0134* (2006.01)
  *B60R 21/01* (2006.01)

(52) U.S. Cl.
  CPC ............... *B60R 21/01554* (2014.10); *B60R 2021/01054* (2013.01); *B60R 2021/01286* (2013.01)

(58) Field of Classification Search
  CPC ........ B60R 21/013; B60R 2021/01054; B60R 2021/01286
  See application file for complete search history.

(56) References Cited

U.S. PATENT DOCUMENTS

| | | | |
|---|---|---|---|
| 7,479,749 B2 | 1/2009 | Gerding et al. | |
| 7,644,799 B2 | 1/2010 | Friedman et al. | |
| 8,251,397 B2 * | 8/2012 | Tabe | B60R 21/0152 280/728.1 |
| 2001/0009337 A1 | 7/2001 | Ueno et al. | |
| 2001/0040065 A1 * | 11/2001 | Takagi | B60R 21/01554 180/274 |
| 2004/0212226 A1 | 10/2004 | Bethge | |
| 2005/0131606 A1 | 6/2005 | Motozawa | |
| 2005/0283292 A1 | 12/2005 | Kawato et al. | |
| 2006/0001298 A1 | 1/2006 | Manabu et al. | |
| 2006/0175116 A1 | 8/2006 | Friedman | |
| 2006/0249324 A1 | 11/2006 | Dirk | |
| 2007/0096447 A1 * | 5/2007 | Tabe | B60R 21/017 280/735 |
| 2007/0185635 A1 | 8/2007 | Mattes | |
| 2008/0059028 A1 | 3/2008 | Willerton | |
| 2011/0221247 A1 * | 9/2011 | Hashimoto | B60R 21/0134 297/216.13 |
| 2013/0184941 A1 | 7/2013 | Freienstein et al. | |
| 2013/0325323 A1 * | 12/2013 | Breed | G01C 21/3667 701/420 |
| 2014/0188347 A1 * | 7/2014 | Tabe | B60R 21/01516 701/45 |
| 2014/0309806 A1 * | 10/2014 | Ricci | G05D 23/1917 701/1 |
| 2014/0310739 A1 * | 10/2014 | Ricci | G06Q 20/321 725/75 |
| 2016/0339782 A1 | 11/2016 | Seong et al. | |
| 2017/0129442 A1 * | 5/2017 | Choi | B60R 21/232 |
| 2018/0222360 A1 | 8/2018 | Fournier | |

OTHER PUBLICATIONS

International Preliminary Report on Patentability for Application No. PCT/US2016/058161 dated May 2, 2019 (8 pages).

* cited by examiner

PRE-CRASH SEAT ACTUATOR SYSTEM AND METHOD

CROSS-REFERENCE TO RELATED APPLICATIONS

The present application is a divisional of and claims priority to U.S. patent application Ser. No. 16/336,674, filed on Mar. 26, 2019, which claims priority to PCT/US2016/058161, filed Oct. 21, 2016.

BACKGROUND

The present invention relates to a system and method for operating a pre-crash seat actuator system to minimize inadvertent operation of a powered vehicle seat.

SUMMARY

In one embodiment, the invention provides a pre-crash seat actuator system for moving a vehicle seat of a vehicle. The pre-crash seat actuator system includes an electronic stability control, a pre-collision sensor unit for sensing objects near the vehicle, and an occupant protection control system that includes an occupant protection control processor. The occupant protection control processor configured to: receive inputs from the electronic stability control and the pre-collision sensor unit, use the inputs to determine that a collision is imminent, and when a collision is imminent, provide a trigger signal and an enable signal. The system includes a vehicle seat controller including a seat control processor that is configured to: receive the trigger signal, determine a direction and a distance for moving the vehicle seat when a collision is imminent from a current seat position of the vehicle seat, and in response to the trigger signal, provide a fast mode voltage for moving the vehicle seat in a fast mode. The system includes a smart control adapter including a voltage sensor for sensing the voltage received from the vehicle seat controller, and a smart controller. The smart controller is configured to: determine whether voltage received from the vehicle seat controller is the fast mode voltage for moving the vehicle seat in the fast mode, determine whether the enable signal is received from the occupant protection control system, and when the voltage received corresponds to the fast mode voltage and the enable signal is received, provide the fast mode voltage received from the vehicle seat controller to a vehicle seat electric drive to move the vehicle seat in the direction to mitigate severity of a collision to an occupant of the vehicle seat.

In another embodiment, the invention provides a method for moving a vehicle seat when a collision is imminent comprising determining that a collision is imminent with an occupant protection control system and providing at least one trigger signal and at least one enable signal from the occupant protection control system when a collision is imminent. In response to receiving the at least one trigger signal, a vehicle seat controller provides a fast mode voltage on a power connector to a smart control adapter that includes a smart controller. In response to receiving the voltage from the vehicle seat controller, the smart controller determines whether the voltage provided by the vehicle seat controller corresponds to the fast mode voltage for the vehicle seat, and when the voltage received corresponds to the fast mode voltage and the smart controller determines that the enable signal is received, the smart controller provides the fast mode voltage to a vehicle seat electric drive. The vehicle seat electric drive moves the vehicle seat in response to the fast mode voltage received via the smart controller to mitigate the severity of a collision on an occupant of the vehicle seat.

In another embodiment, the invention provides a smart control adapter for a vehicle, comprising a connector power port for receiving a power connector from a vehicle seat controller, an output connector port for providing voltage from the smart control adapter to a vehicle seat electric drive, an enable input port for receiving an enable signal from an occupant protection control system when an imminent collision is determined, a voltage sensor for sensing voltage provided on the power connector, and a smart controller. The smart controller is configured to: receive the sensed voltage from the sensor and determined whether the sensed voltage corresponds to a fast mode voltage, determine whether the enable signal is received or not received, provide no voltage to the vehicle seat electric drive when the fast mode voltage is received and the enable signal is not received, and provide the fast mode voltage to the vehicle seat electric drive when the fast mode voltage provided by the vehicle seat controller is received and the enable signal is received.

In another embodiment, the invention provides a method for moving a vehicle seat when a collision is probable comprising determining that a collision is probable with an occupant protection control system and providing at least one trigger signal and at least one collision signal from the occupant protection control system when a collision is probable. In response to receiving the at least one trigger signal and the at least one collision signal by a vehicle seat controller, the method provides a fast mode voltage from the vehicle seat controller on a power connector to a vehicle seat electric drive for moving the vehicle seat from a starting seat position to a desired seat position to mitigate the severity of a collision on an occupant of the vehicle seat. In response to loss of the collision signal, the method provides a voltage on the power connector from the vehicle seat controller to the vehicle seat electric drive to return the vehicle seat to the starting seat position.

Other aspects of the embodiments will become apparent by consideration of the detailed description and accompanying drawings.

DETAILED DESCRIPTION

Before any embodiments of the invention are explained in detail, it is to be understood that the embodiments are not limited in its application to the details of construction and the arrangement of components set forth in the following description or illustrated in the following drawings. The invention is capable of other embodiments and of being practiced or of being carried out in various ways.

Figure 1:
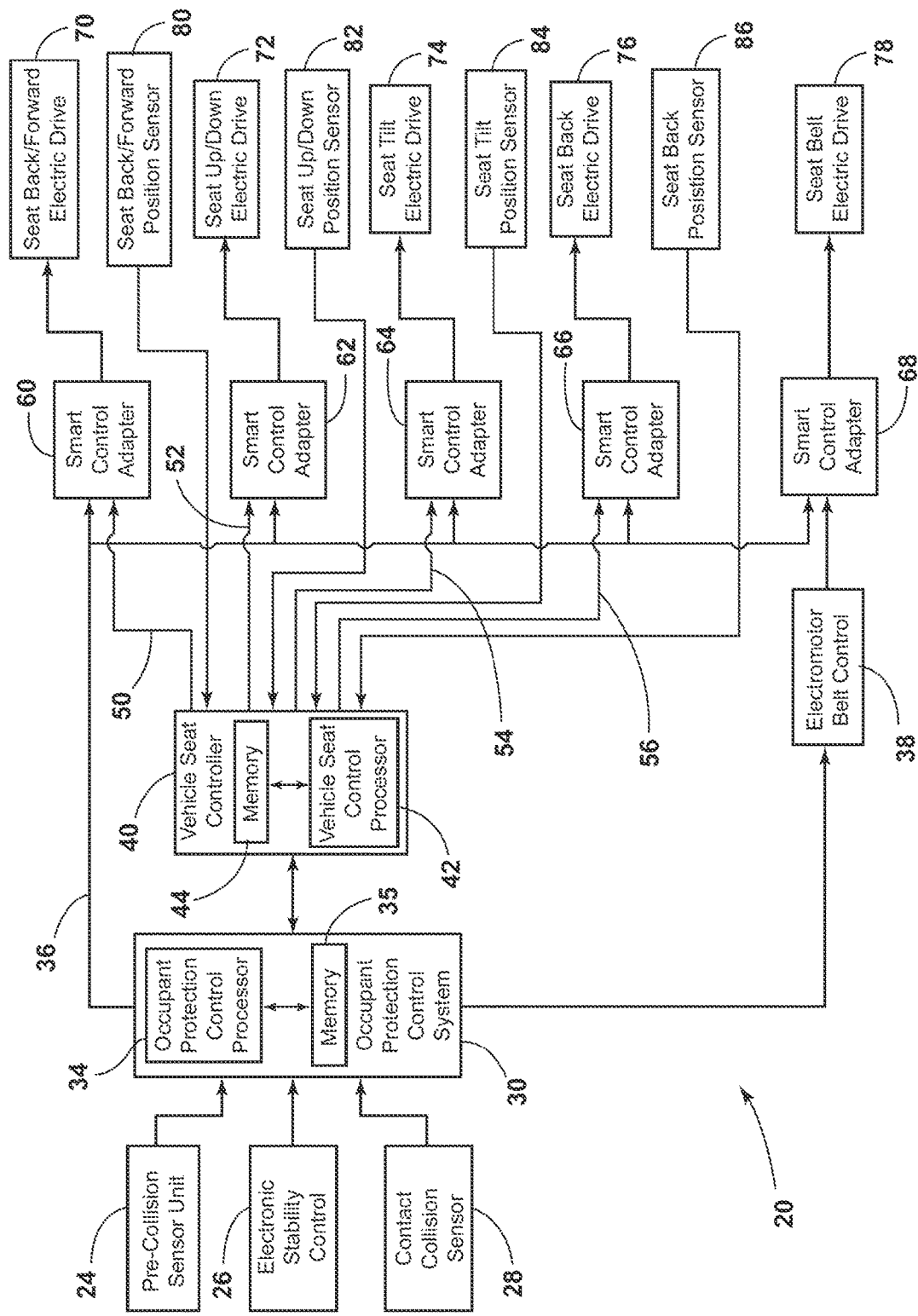
FIG. 1 is a block diagram of a pre-crash seat actuator system.

FIG. 1 is a block diagram of a pre-crash seat actuator system 20 according to one embodiment. In one embodiment, a pre-collision sensor unit 24 includes at least one sensor from the group consisting of a radar sensor, a Lidar sensor, a video imaging sensor, and an ultrasonic sensor. Other sensing principles are contemplated. In some embodiments, multiple sensors of each type are contemplated for the pre-collision sensor unit 24. Sensing of potential collisions with frontwardly located or rearwardly located vehicles or objects near or about the vehicle having the vehicle seat is contemplated. In one embodiment, the pre-collision sensor unit 24 is capable of determining the speed and direction of movement of other nearby vehicles to assist in determining whether a collision is imminent.

FIG. 1 shows an electronic stability control 26 that controls vehicle speed and other conditions to provide vehicle stability by detecting and reducing loss of traction (skidding). FIG. 1 also shows a contact collision sensor 28 that can be an accelerometer or other type of collision sensor. In one embodiment, the contact collision sensor 28 is disposed within an occupant protection control system 30. In some embodiments, the pre-collision sensor unit 24, the electronic stability control 26 and the contact collision sensor 28 are in communication with the occupant protection control system 30 via a communication bus, such as a Flex-ray or a controller area network (CAN) bus. In other embodiments, individual electrical connections are provided for some or all of the units and sensors.

The occupant protection control system 30 includes an occupant protection control processor 34 that determines an impending vehicle collision from inputs from the pre-collision sensor unit 24 and the electronic stability control 26. The occupant protection control system 30 includes a memory 35 for storing algorithms or programs executable by the occupant protection control processor 34. The occupant protection control processor 34 also determines a vehicle collision or vehicle crash condition in response to inputs from the contact collision sensor 28 of the vehicle. The occupant protection control system 30 is in communication with a smart control bus 36 and with an electromotor belt control 38. In one embodiment, the smart control bus 36 is a peripheral sensor interface 5 (PSI5) two-wire communication bus. Further, the occupant protection control system 30 is connected by a communication bus or other communication arrangement to a vehicle seat controller 40 as shown in FIG. 1.

The vehicle seat controller 40 includes a vehicle seat control processor 42 for processing various input signals and providing various output power signals over separate power connectors 50, 52, 54, 56 as shown in FIG. 1, along with a memory 44. Further, FIG. 1 shows the power connectors 50, 52, 54, 56 connecting to respective smart control adapters 60, 62, 64, 66. An additional smart control adapter 68 connects to the electromotor belt control 38. All of the smart control adapters 60, 62, 64, 66, 68 are in communication with the occupant protection control system 30 via the smart control bus 36.

FIG. 1 shows the smart control adapter 60 connected for providing power to a seat back/forward electric drive 70. Further, the smart control adapter 62 is capable of providing power to a seat up/down electric drive 72. The smart control adapter 64 is connected to a seat tilt electric drive 74 for providing power to an electric motor thereof and the smart control adapter 66 is connected to the seat back electric drive 76 to provide power thereto. Finally, the smart control adapter 68 is connected to the seat belt electric drive 78 to provide power thereto.

FIG. 1 also shows a seat back/forward position sensor 80 for sensing seat back/forward position or movement and providing the sensed information to the vehicle seat controller 40 over a communication line. In one embodiment, the position sensor 80 is a Hall effect sensor that senses rotation of an electric motor of the seat back/forward electric drive 70. In another embodiment, the sensor is a position switch that senses the movement of the seat through a particular position along a track or rail for permitting movement of the vehicle seat. Finally, the position sensor 80 may include both a Hall effect sensor and one or more position switches.

FIG. 1 also shows a seat up/down position sensor 82 for sensing seat up/down position or movement and providing the sensed information to the vehicle seat controller 40 over a communication line. In one embodiment, the seat up/down position sensor 82 is a Hall effect sensor and/or one or more position switches for sensing up/down movement of the vehicle seat.

FIG. 1 shows a seat tilt position sensor 84 for sensing seat tilting and providing the sensed information to the vehicle seat controller 40 over a communication line. In one embodiment, the seat tilt position sensor 84 is a Hall effect sensor for sensing operation of a motor of the seat tilt electric drive 74 and/or a tilt sensor for sensing tilting movement of the vehicle seat.

FIG. 1 also shows a seat back position sensor 86 for sensing seat back position or angle and providing the sensed information to the vehicle seat controller 40 over a communication line. In one embodiment, the seat back position sensor 86 is a Hall effect sensor for sensing operation of a motor of the seat back electric drive 76. In another embodiment, the seat back position sensor is an angle sensing arrangement for sensing the exact angle of the seat back of the vehicle seat.

Figure 2:
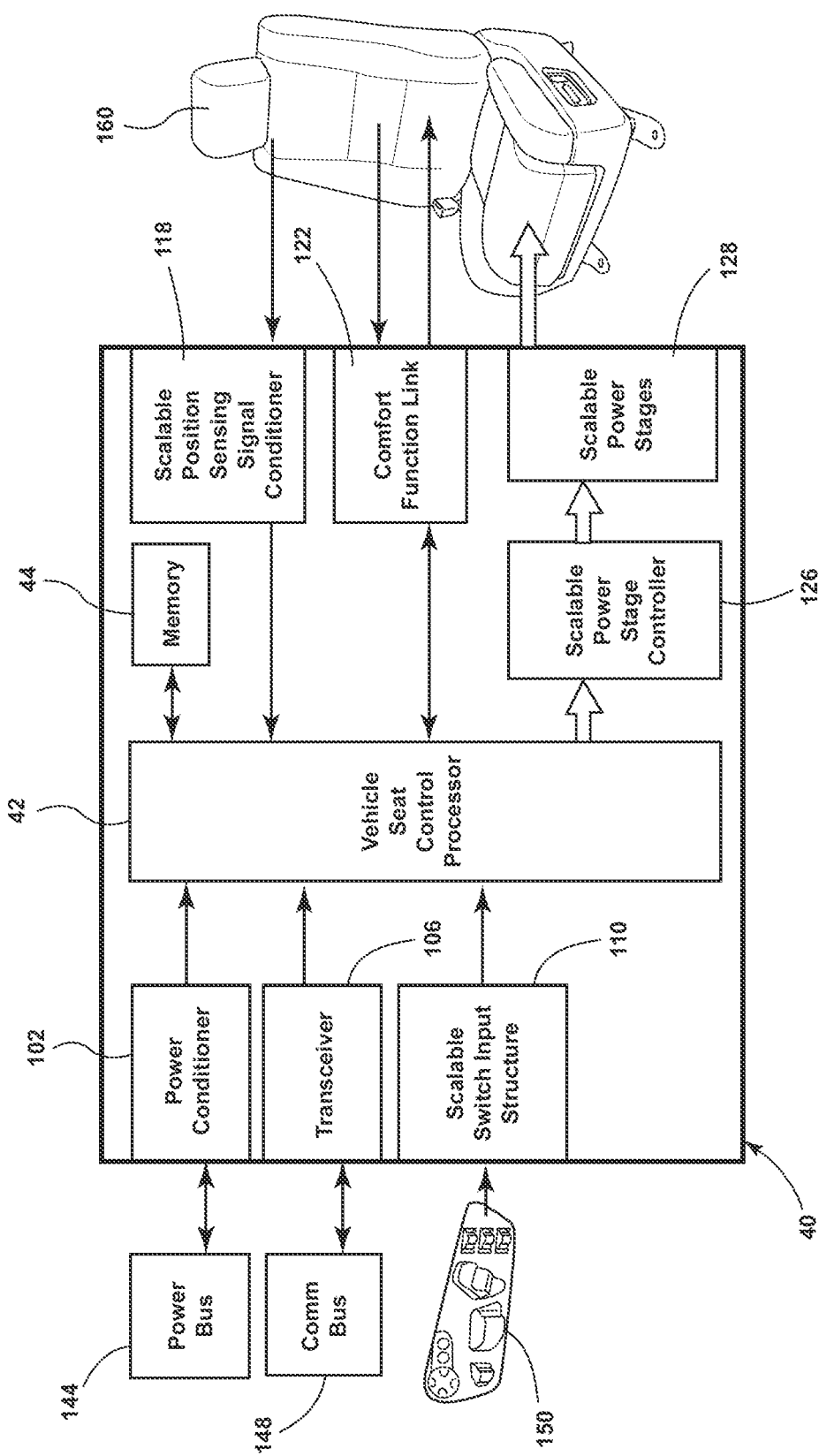
FIG. 2 is a block diagram of a vehicle seat controller and devices connected thereto.

FIG. 2 is an enhanced block diagram of the vehicle seat controller 40 shown in FIG. 1 and includes devices connected thereto. The vehicle seat controller 40 includes a power conditioner 102 for receiving power, a transceiver 106 for communication, and a scalable switch input structure 110. Further, the vehicle seat controller 40 includes a scalable position sensing signal conditioner 118 and a comfort function link 122. The vehicle seat controller 40 includes a scalable power stage controller 126 and a scalable power stage 128 for selectively providing power to from 3 to 7 electric drives. In one embodiment, the scalable power stage 128 is a H-bridge power stage.

FIG. 2 also shows a power bus 144 for providing power to the vehicle seat controller 40. A communication bus 148 also is connected to the vehicle seat controller 40 via the transceiver 106. A user control interface 150 with a plurality of touch switches is shown in FIG. 2. The user control interface 150 provides inputs via the scalable switch input structure 110 to the vehicle seat control processor 42.

Further, FIG. 2 shows a powered vehicle seat 160 for purposes of illustration only. The vehicle seat controller 40 typically is disposed within the powered vehicle seat 160.

Figure 3:
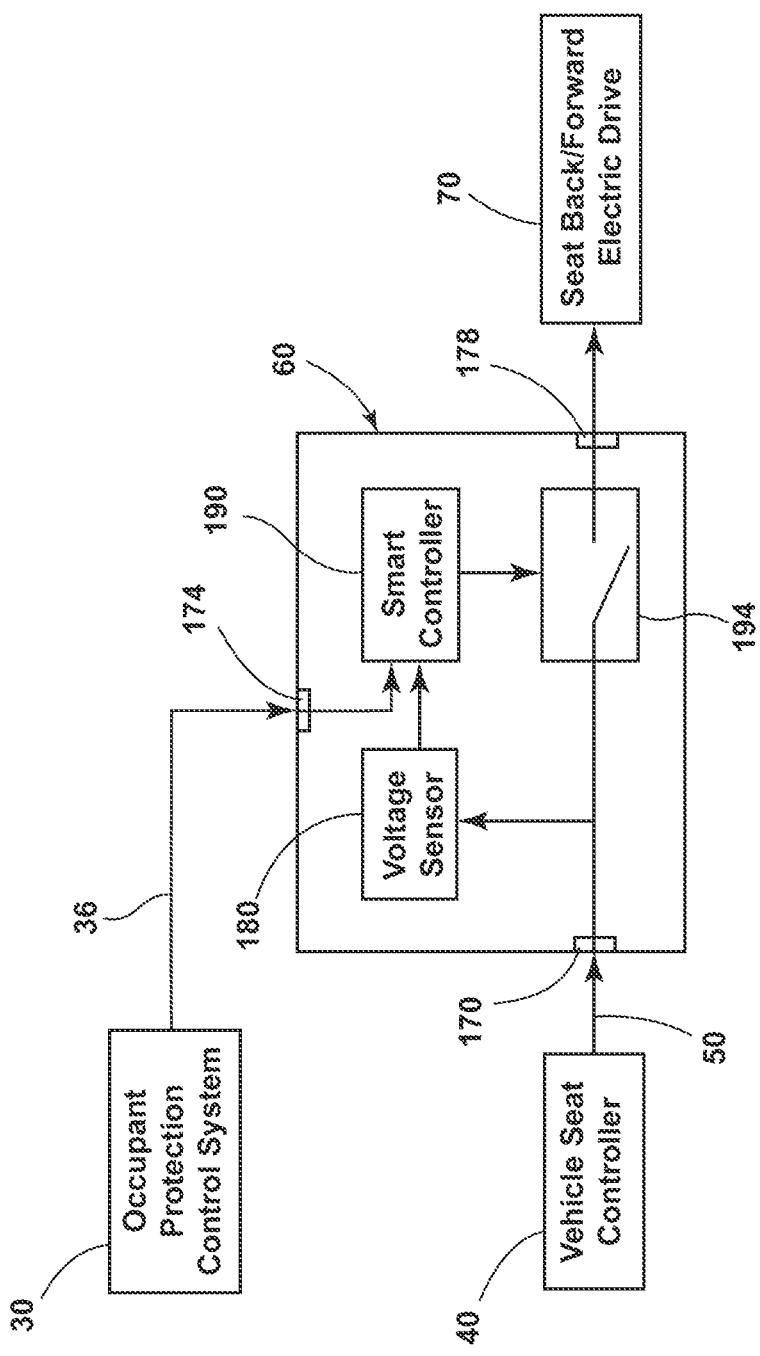
FIG. 3 is a block diagram of a smart control adapter and devices connected thereto.

FIG. 3 shows an enhanced block diagram of the smart control adapter 60 that includes connections to receive inputs from the occupant protection control system 30 and from the vehicle seat controller 40. Further, the smart control adapter 60 selectively provides power to the seat back/forward electric drive 70.

The block diagram of FIG. 3 further shows the smart control adapter 60 including a connector power port 170 for connecting to the power connector 50. The smart control adapter 60 includes a enable input port 174 for connecting to the smart control bus 36 and a output connector port 178 for connecting to a power line or power connector of the seat back/forward electric drive 70.

The circuit for the smart control adapter 60 includes a voltage sensor 180 for determining the voltage received from power connector 50. A smart controller 190 receives the output of the voltage sensor 180 and an enable signal from the smart control bus 36. The smart controller 190 is connected to open and close a switch circuit 194. The switch circuit 194 provides a path for power from the power connector 50 to the seat back/forward electric drive 70.

The smart control adapters 62, 64, 66 and 68 have similar arrangements with the respective power connectors and the respective vehicle seat electric drives 72, 74, 76, 78. Thus, further illustration is not necessary.

Vehicle Seat Operation

Figure 4:
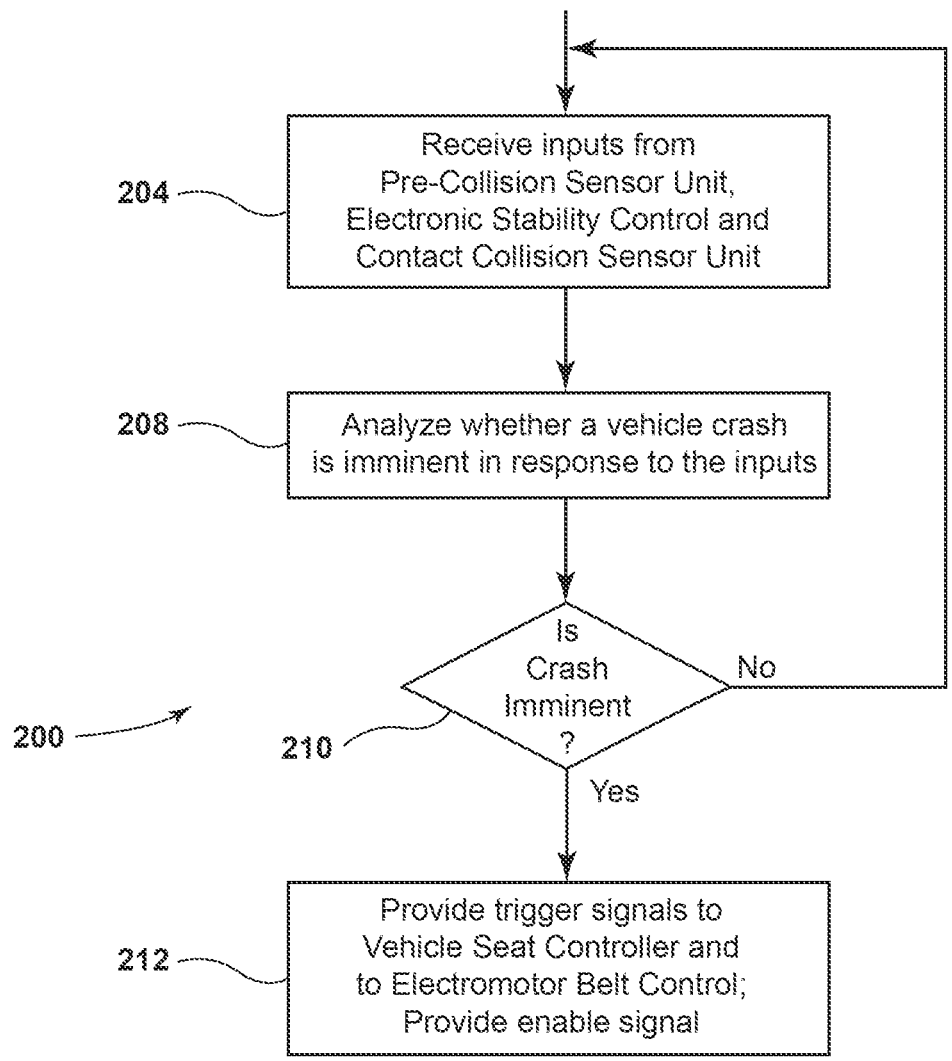
FIG. 4 is a flow chart for a method of operating an occupant protection control system.

FIG. 4 is a flow chart illustrating operation of the occupant protection control system 30. The occupant protection control system 30 receives inputs from the pre-collision sensor unit 24, electronic stability control 26 and the contact collision sensor 28 (step 204). The pre-collision sensor unit 24 provides outputs from one or more groups of sensors, including radar sensors, Lidar sensors, video imaging sensors, and ultrasonic sensors. The electronic stability control 26 provides vehicle speed information, vehicle skidding information, lateral force information, acceleration and other relevant data as to the operation of the vehicle. The contact collision sensor 28 provides acceleration information related to a vehicle collision.

The occupant protection control processor 34 is configured to execute one or more pre-crash algorithms using inputs from the pre-collision sensor unit 24 and the electronic stability control 26 to analyze whether a vehicle is about to have a collision with another vehicle or a stationary object (step 208). The occupant protection control processor 34 also determines whether the vehicle is about to skid from a roadway.

In response to the determination of an imminent collision not occurring (step 210), the program returns to again receive inputs (step 204). If a collision is determined to be imminent, the occupant protection control processor 34 outputs at least one trigger signal to the vehicle seat controller 40 and to the electromotor belt control 38, along with at least one enable signal on the smart control bus 36 (step 212). At least one trigger signal indicates that fast mode operation of the vehicle seat controller 40 is desired.

Figure 5:
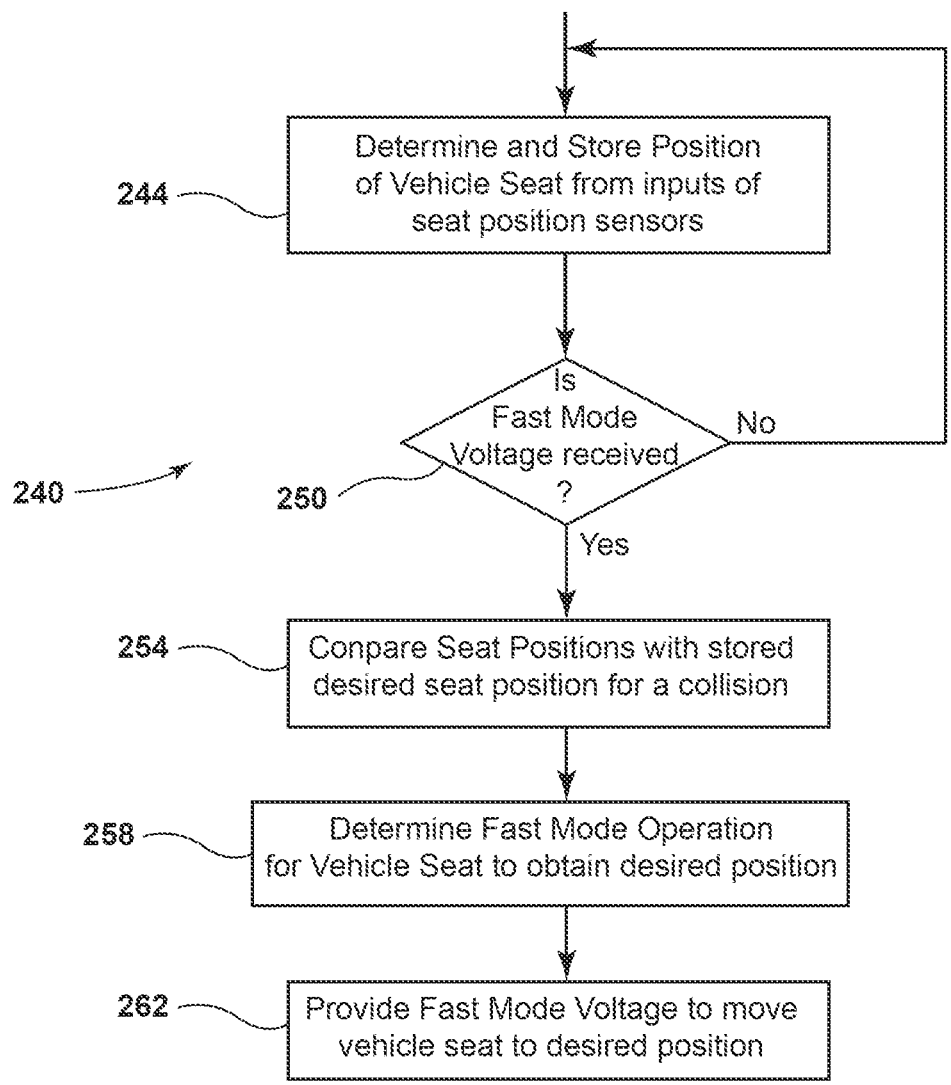
FIG. 5 is a flow chart for a method of operating the vehicle seat controller.

FIG. 5 is a flow chart 240 showing operation of the vehicle seat controller 40. The vehicle seat controller 40 receives inputs or a seat position signal from each of the seat position sensors 80, 82, 84, 86 of the respective powered vehicle seat electric drives 70, 72, 74, 76 of the powered vehicle seat 160. In one embodiment, the seat position sensors track the operation and the rotation of electric motors of the respective vehicle seat electric drives 70, 72, 74, 76. In another embodiment, additional position switches are provided for the seat position sensors 80, 82, 84, 86 that indicate when the powered vehicle seat 160 is at or moving past a definite known position. The vehicle seat control processor 42 is configured to execute an algorithm or computer programs to analyze the information from the seat position sensors 80, 82, 84, 86 to determine the seat back/forward position, the seat up/down position, the seat tilt position and the seat back position (step 244), respectively. Sensing movement of a powered vehicle seat 160 past a known position along a track or path enables recalibrating of a seat position by providing an exact seat position signal to the vehicle seat control processor 42. The determined or calculated positions are stored and maintained by the vehicle seat control processor 42. Then determinations are made whether the powered vehicle seat 160 is moved by an occupant utilizing the user control interface 150 in a slow mode of operation or during seat movement in a fast mode in anticipation of a vehicle collision. The seat position information is stored by the vehicle seat controller 40 in either mode and maintained when the vehicle is not in use.

The vehicle seat control processor 42 determines whether an input received from the occupant protection control system 30 is for a fast mode (step 250). If a fast mode is not detected, the vehicle seat control processor 42 returns to determine the various seat positions.

When a fast mode is detected, the vehicle seat control processor 42 is configured for comparing each current seat position with respective stored desired seat positions for each of the positions that is stored in memory 44 (step 254) for an imminent collision. The stored desired seat positions are typically provided by a vehicle manufacturer and stored in the memory 44 provided with the vehicle seat controller 40. The desired seat position corresponds to a position to mitigate severity of a collision for an occupant of the vehicle seat.

After the comparison, the vehicle seat control processor 42 is configured to determine fast mode operation for the vehicle seat to achieve the desired position (step 258). The direction of movement and a distance for the seat in tilting, up/down, and forward/backward, along with the angle of the seatback or back rest are determined. This determination includes whether a positive polarity or a negative polarity is provided for the power or voltage that is output for controlling the powered vehicle seat 160 or seat component in the proper direction.

Thereafter, the vehicle seat controller 40 provides fast mode voltage on power connectors 50, 52, 54, 56 as necessary to move the seat to the appropriate position and orientation (step 262). In some instances, wherein the powered vehicle seat 160 is already at the proper height or forward location, no power is applied to the particular power connector.

Figure 6:
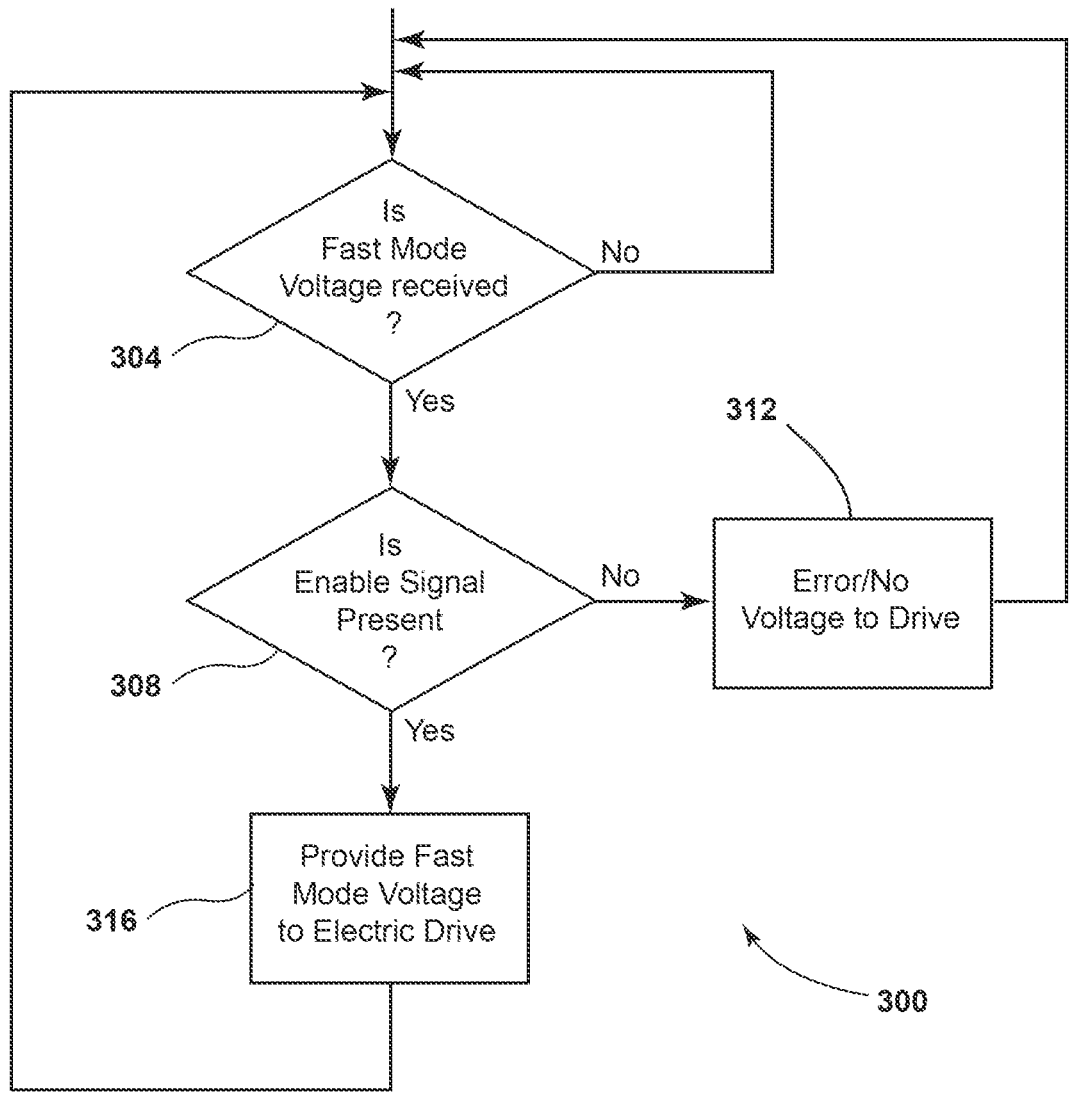
FIG. 6 is a flow chart for a method of operating the smart control adapter.

FIG. 6 is a flow chart 300 showing operation of one smart control adapter 60. The other smart control adapters operate in a similar manner. In operation, the voltage sensor 180 senses voltage received by the smart control adapter 60 and the voltage is compared by the smart controller 190 with a corresponding stored or predetermined fast mode voltage level or voltage range, to determine if a fast mode voltage is received (step 304). When the sensed voltage is less than a fast mode voltage level, the smart controller returns to the beginning of the program.

When the sensed voltage is greater than or equal to a voltage level for the fast mode, the smart controller 190 determines that the sensed voltage corresponds to the fast mode voltage and then advances to determine whether an enable signal is present on the smart control bus 36 (step 308). When the enable signal is absent, the smart controller 190 considers the situation as an error or fault. The smart controller 190 controls the switch circuit 194 to ensure that no voltage is provided to a motor of the seat back/forward electric drive 70.

When the enable signal is present on the smart control bus 36 (step 308), the smart controller 190 controls the switch circuit 194 to provide the fast mode voltage to the vehicle seat back/forward electric drive 70. Thus, the seat is moved forwardly or rearward toward the desired seat position for a collision. The fast mode voltage is greater than the slow mode voltage and, thus enables movement of the powered vehicle seat 160 or a vehicle seat component, such as a seat back, at a velocity that is from three to seven times faster than movement thereof in the slow mode. Thus, pivoting or rotation of the seat back occurs at a velocity from three to seven times faster than movement thereof in the slow mode.

Besides moving the powered vehicle seat 160 forward and backward, the powered vehicle seat 160 is tilted and raised up or down, along with the movement of the seat back, to obtain the stored desired seat position to mitigate severity of a collision to an occupant of the powered vehicle seat.

In one embodiment, the power applied on the power connector 50 is a pulse width modulated (PWM) voltage. Thus, the amount of power is dependent on the pulse width of the applied voltage. In this embodiment, the voltage sensor 180 senses the voltage over a time period to determine a fast mode voltage, which is much greater than a slow mode voltage.

While the above arrangement shown in FIG. 3 and the method illustrated in FIG. 6 are provided for the seat back/forward electric drive 70, similar arrangements are provided for providing voltage to the seat up/down electric drive 72, the vehicle seat tilt electric drive 74 and the vehicle seat back electric drive 76 for adjusting the seat back angle. In one embodiment, the motors of the vehicle seat electric drives 70, 72, 74, 76 are DC brush motors.

Providing no voltage from the smart control adapter 60, 62, 64, 66 to the respective vehicle seat electric drive 70, 72, 74, 76 when the fast mode voltage is received and the enable signal is not received by the smart control adapter, acts to limit inadvertent actuation of the vehicle seat electric drive.

Vehicle Seat Belt Operation

As shown in FIG. 1, the electromotor belt control 38 receives an input or trigger signal from the occupant protection control system 30. In response to the trigger signal indicating an imminent collision, the electromotor belt control 38 outputs power to the smart control adapter 68. The smart control adapter 68 includes a current or voltage sensor similar to the arrangement shown in FIG. 3. When the current level is greater than a stored or predetermined current level and the enable signal is present, the smart control adapter provides the power to the seat belt electric drive 78 to tighten or maintain tension of the seat belt of an occupant before a collision occurs. Tightening or tensioning of the seat belt of an occupant occurs only after movement of the vehicle seat 160 is completed or stopped.

While the embodiment shown in FIG. 1 provides an arrangement for a single vehicle seat, in another embodiment, the arrangement is provided for each powered vehicle seat provided in a vehicle.

The memory 35 and the memory 44 are non-transitory computer readable memory modules that may include volatile memory, non-volatile memory, or a combination thereof and, in various constructions, may also store operating system software, applications/instructions data, and combinations thereof. The memory 35 and the memory 44 are typically read-only memory (ROM) and/or random access memory (RAM).

The occupant protection control processor 34 and the vehicle seat control processor 42 are designed to execute algorithms. However, other arrangements such as application-specific integrated circuits (ASIC) and digital circuits are contemplated for signal processing. The processors include microprocessors and other computing devices. In one embodiment, the smart controller 190 is an ASIC circuit. In another embodiment, the smart controller 190 is a processor that includes a memory.

While not discussed in detail above, the enable signals provided by the vehicle seat control processor 42 on the smart control bus 36, are different individual enable signals recognizable by the different smart control adapters 60, 62, 64, 66, 68.

Second Embodiment of Pre-Crash Seat Actuator System

Figure 7:
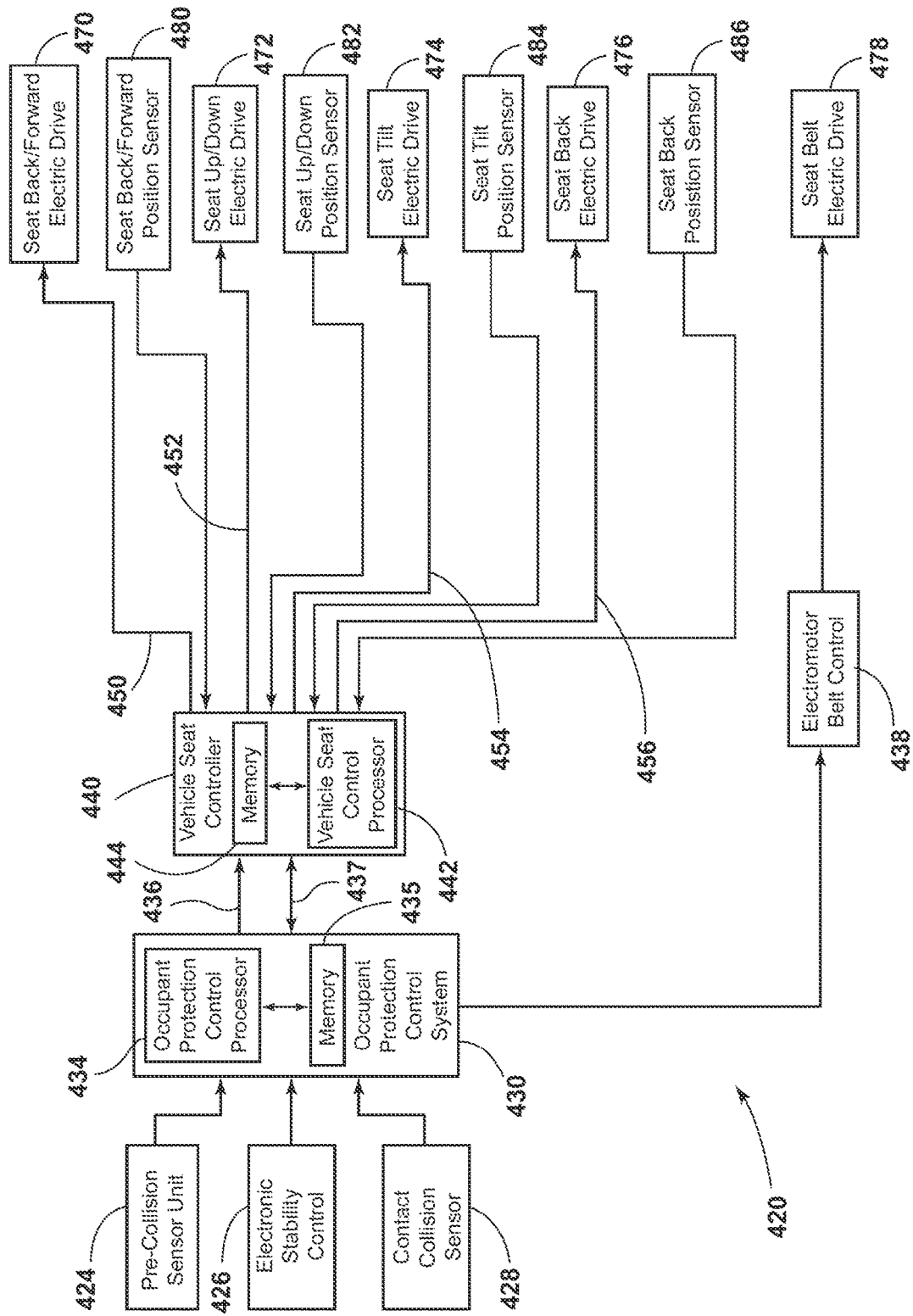
FIG. 7 is a block diagram of an embodiment of a pre-crash seat actuator system.

FIG. 7 is a block diagram of a pre-crash seat actuator system 420 according to another embodiment. A pre-collision sensor unit 424 includes at least one sensor from the group consisting of a radar sensor, a Lidar sensor, a video imaging sensor and an ultrasonic sensor. In some embodiments, multiple sensors of each type are contemplated for the pre-collision sensor unit 424. Sensing of potential collisions with frontwardly located or rearwardly located vehicles or objects near or about the vehicle is contemplated. In one embodiment, the pre-collision sensor unit 424 is capable of determining the speed and direction of movement of other nearby vehicles to assist in determining whether a collision is imminent.

FIG. 7 shows an electronic stability control 426 that controls vehicle speed and other conditions to provide vehicle stability by detecting and reducing loss of traction (skidding). FIG. 7 also shows a contact collision sensor 428 that can be an accelerometer or other type of collision sensor. In one embodiment, the contact collision sensor 428 is disposed within an occupant protection control system 430. In some embodiments, the pre-collision sensor unit 424, the electronic stability control 426 and the contact collision sensor 428 are in communication with the occupant protection control system 430 via a communication bus, such as a Flex-ray or a CAN bus. In other embodiments, individual electrical connections are provided for some or all of the units and sensors.

The occupant protection control system 430 includes an occupant protection control processor 434 that determines an impending vehicle collision from inputs from the pre-collision sensor unit 424 and the electronic stability control 426. The occupant protection control system 430 includes a memory 435 for storing algorithms or programs executable by the occupant protection control processor 434. The occupant protection control processor 434 also determines a vehicle collision or vehicle crash condition in response to inputs from the contact collision sensor 428 of the vehicle. The occupant protection control system 430 is in communication with an electrical connector 436, a communication bus 437 and an electromotor belt control 438. In one embodiment, the electrical connector 436 is a hard wire connector. The occupant protection control system 430 is directly connected via the electrical connector 436 and over the communication bus 437 to a vehicle seat controller 440 as shown in FIG. 7.

The vehicle seat controller 440 includes a vehicle seat control processor 442 for processing various input signals and providing various output power signals over separate power connectors 450, 452, 454, 456 as shown in FIG. 7, along with a memory 444. Further, FIG. 7 shows the power connectors 450, 452, 454, 456 connecting to respective electric drives. More specifically, FIG. 7 shows the power connector 450 connected to a seat back/forward electric drive 470 and the power connector 452 connected to a vehicle seat up/down electric drive 472. The power connector 454 is connected to a seat tilt electric drive 474 for providing power to an electric motor thereof and the power connector 456 is connected to the seat back electric drive 476 to provide power thereto. Finally, the electromotor belt control 438 is connected to the seat belt electric drive 478 to provide power thereto.

FIG. 7 also shows a seat back/forward position sensor 480 for sensing seat back/forward position or movement and providing the sensed information to the vehicle seat controller 440 over a communication line. In one embodiment, the position sensor 480 is a Hall effect sensor that senses rotation of an electric motor of the seat back/forward electric drive 470. In another embodiment, the sensor is a position switch that senses the movement of the seat through a particular position along a track or rail that enables movement of the vehicle seat. Finally, the position sensor 480 may include both a Hall effect sensor and one or more position switches.

FIG. 7 shows a seat up/down position sensor 482 for sensing seat up/down position or movement and providing the sensed information to the vehicle seat controller 440 over a communication line. In one embodiment, the seat up/down position sensor 482 is a Hall effect sensor and/or one or more position switches for sensing up/down movement of the vehicle seat.

FIG. 7 shows a seat tilt position sensor 484 for sensing seat tilting and providing the sensed information to the vehicle seat controller 440 over a communication line. In one embodiment, the seat tilt position sensor 484 is a Hall effect sensor for sensing operation of a motor of the seat tilt electric drive 474 and/or a tilt sensor for sensing tilting movement of the vehicle seat.

FIG. 7 also shows a seat back position sensor 486 for sensing seat back position or angle and providing the sensed information to the vehicle seat controller 440 over a communication line. In one embodiment, the seat back position sensor 486 is a Hall effect sensor for sensing operation of a motor of the seat back electric drive 476. In another embodiment, the seat back position sensor 486 is an angle sensing arrangement for sensing the exact angle of the seat back of the vehicle seat.

Figure 8:
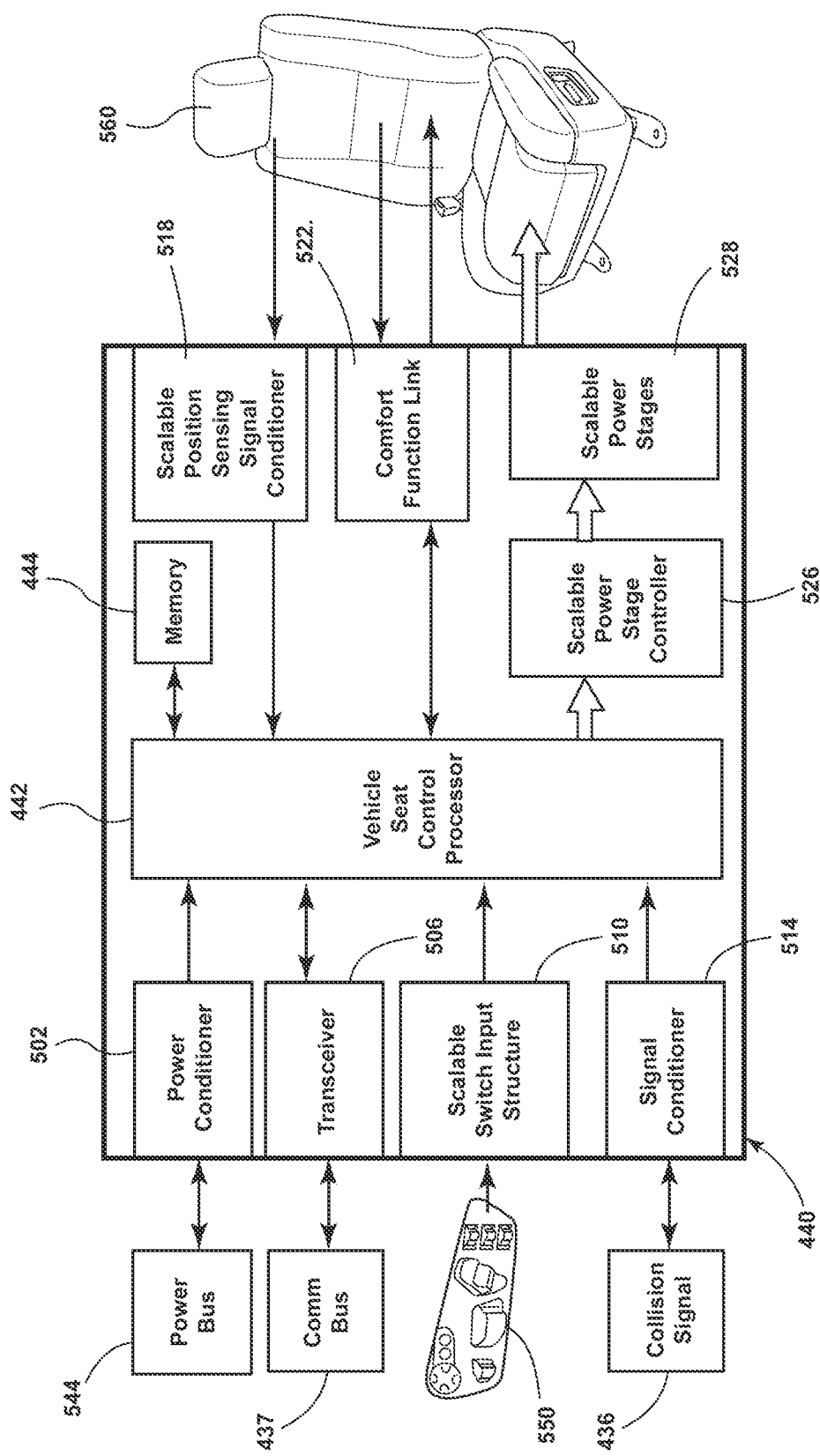
FIG. 8 is a block diagram of a vehicle seat controller and devices connected thereto for the embodiment of FIG. 7.

FIG. 8 is an enhanced block diagram of the vehicle seat controller 440 shown in FIG. 7 and includes devices connected thereto. The vehicle seat controller 440 includes a power conditioner 502 for receiving power, a transceiver 506 for communication, a scalable switch input structure 510 and a signal conditioner 514. The signal conditioner 514 receives the collision signal from the directly wired electrical connector 436 and provides a conditioned signal to the vehicle seat control processor 442.

Further, the vehicle seat controller 440 includes a scalable position sensing signal conditioner 518 that provides position signals to the vehicle seat control processor 442. The vehicle seat controller 440 also includes a comfort function link 522. The vehicle seat controller 440 includes a scalable power stage controller 526 and a scalable power stage 528 for selectively providing power to between 3 to 7 electric drives, such as the vehicle seat electric drives 470, 472, 474, 476. In one embodiment, the scalable power stage 528 is a H-bridge power stage.

FIG. 8 also shows a power bus 544 for providing power to the vehicle seat controller 440. The communication bus 437 also is connected to the vehicle seat control processor 442 via the transceiver 506. A user control interface 550 with a plurality of touch switches is shown in FIG. 8. The user control interface 550 provides inputs via the scalable switch input structure 510 to the vehicle seat control processor 542. In one embodiment, the collision signal is provided on the electrical connector 436 connecting the occupant protection control system 430 to the vehicle seat controller 440 for indicating an imminent or high probability of a collision. Further, FIG. 8 shows a powered vehicle seat 560 for purposes of illustration only. The vehicle seat controller 440 typically is disposed within the powered vehicle seat 560.

Vehicle Seat Operation—Second Embodiment

Figure 9:
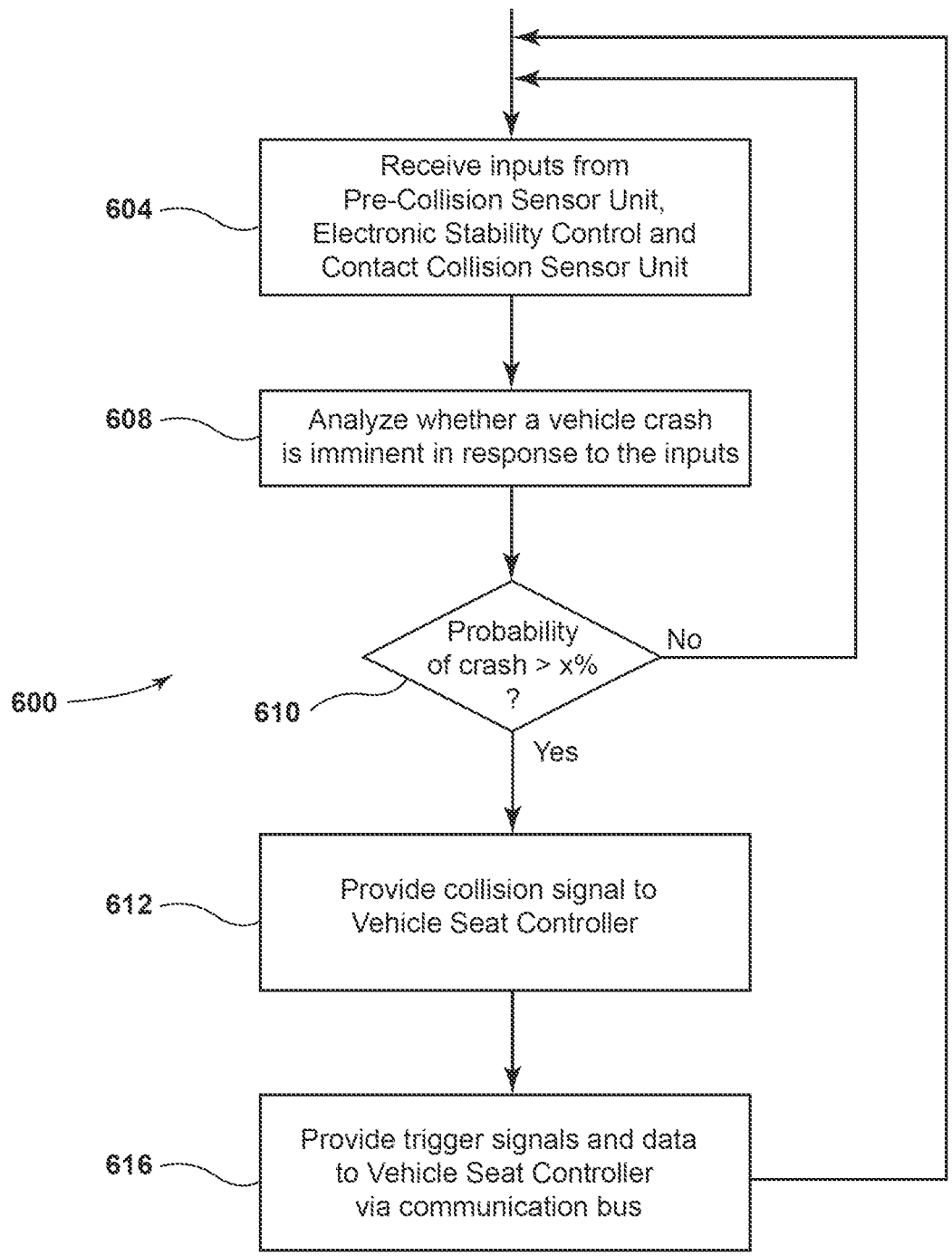
FIG. 9 is a flow chart for a method of operating the occupant protection control system of FIG. 7.

FIG. 9 is a flow chart illustrating operation of the occupant protection control system 430 shown in FIG. 7. The occupant protection control system 430 receives inputs from the pre-collision sensor unit 424, electronic stability control 426 and the contact collision sensor 428 (step 604). The pre-collision sensor unit 424 provides outputs from one or more groups of sensors, including radar sensors, Lidar sensors, video imaging sensors and ultrasonic sensors. The electronic stability control 426 provides vehicle speed information, vehicle skidding information, lateral force information, acceleration and other relevant data as to the operation of the vehicle. The contact collision sensor 428 provides acceleration information related to a vehicle collision.

The occupant protection control processor 434 is configured to execute one or more pre-crash algorithms using inputs from the pre-collision sensor 424 and the electronic stability control 426 to analyze whether a vehicle is about to have a collision with another vehicle or a stationary object (step 608 shown in FIG. 9). The percentage likelihood of a collision is determined. The occupant protection control processor 434 also determines whether the vehicle is about to skid from a roadway.

In response to the probability of a collision occurring being less than a threshold of X % (step 610 shown in FIG. 9), the program returns to again receive inputs (step 604). Variable "X" is a preselected value that is stored in the memory 435 of the occupant protection control system 430 in one embodiment. The X value is at least 70% in one embodiment. If the probability of a collision is greater than a threshold X %, the occupant protection control processor 434 outputs a collision signal to the vehicle seat controller 440 on the electrical connector 436 (step 612). Then, the occupant protection control processor 434 provides various trigger signals and data to the vehicle seat control processor 434 via the communication bus 437 (step 616), and separately provides a belt control signal, in certain instances, to the electromotor belt control 438. At least one trigger signal indicates that a fast mode operation of the vehicle seat controller 40 is desired.

Upon completion of the output of a trigger signal (step 616 shown in FIG. 9), the occupant protection control processor 434 receives inputs from the pre-collision sensor unit 424, electronic stability control 426 and the contact collision sensor 428 (step 604) and reexecutes the program. While the probability of a collision can be high, such as greater than 80%, a vehicle may be operated to avoid a collision. In such an instance, the collision signal provided to the vehicle seat controller (step 612) on the electrical connector 426 is removed before a collision occurs. As the trigger signal is provided to the vehicle seat controller 440 by the occupant protection control processor 434 via the communication bus 437, the collision signal provided on the electrical connector 436 has a faster response time due in part to latency of the communication bus. While the collision signal and the trigger signal are illustrated as being generated in the same flow chart 600 of FIG. 9, in other embodiments two separate subroutines or programs are executed by the occupant protection control processor 434 to provide the collision signal and the trigger signal separately.

Figure 10:
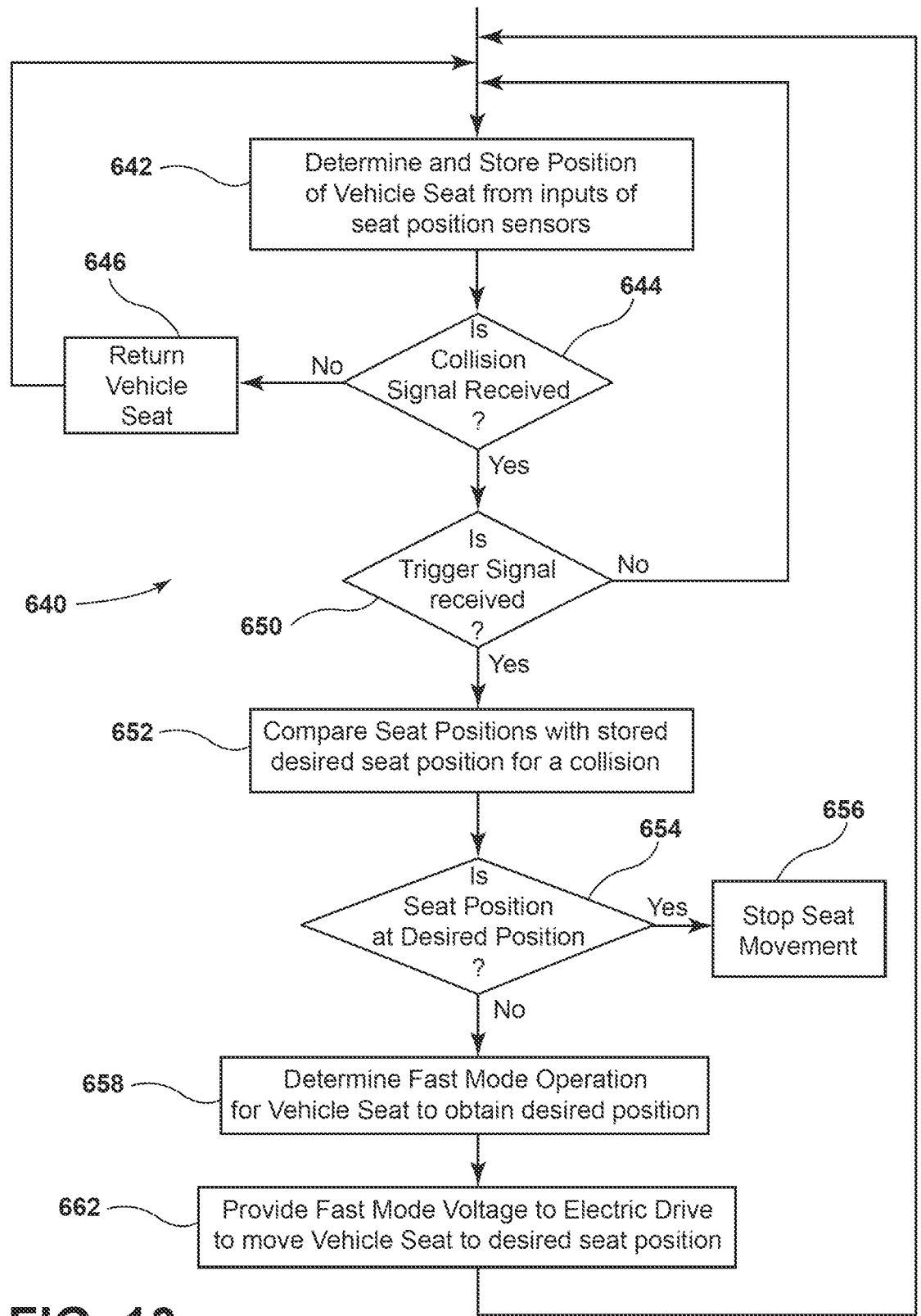
FIG. 10 is a flow chart for a method of operating the vehicle seat controller of FIG. 8.

FIG. 10 is a flow chart 640 illustrating operation of the vehicle seat controller 440 shown in FIGS. 7 and 8. The vehicle seat controller 440 receives inputs from a plurality of different seat position sensors 480, 482, 484, 486 and the vehicle seat control processor 442 processes the inputs to determine a change of position and adjust the previously stored position of the vehicle seat 560 (step 642). Thus, the position of the vehicle seat 560 is updated and stored in the memory 444 of the vehicle seat controller 440.

The vehicle seat control processor 442 is configured to determine whether a collision signal is received from the occupant protection control system 430 (step 644 in FIG. 10). When a collision signal is not received, the program advances so that the vehicle seat 560 either remains stationary or reverses direction (step 646). The vehicle seat 560 reverses direction only when the vehicle seat controller 440 previously was receiving the collision signal and moving toward the desired seat position for a collision. Thus, the vehicle seat 560 is controlled to return to its original or starting seat position at a slow mode voltage when the vehicle seat previously was moving toward the desired position to mitigate a collision when a collision is avoided. In another embodiment, when the collision signal is not received and in addition, there is an absence of a physical collision of the vehicle, the vehicle seat controller 440 returns the vehicle seat 560 to its original starting seat position. The communication bus 437 has a latency or delay. Thus, the collision signal provided by the electrical connector 436 typically is determined and output from the occupant protection control system 430 more quickly than the trigger signal provided on the communication bus 437 to the vehicle seat controller 440. Therefore, using the presence of a collision signal to determine the avoidance of a collision and reset the vehicle seat 560 is a useful approach.

When the vehicle seat control processor 442 determines that a collision signal is received (step 644), the program or algorithm advances to determine whether a trigger signal is received (step 650). When a trigger signal is not received (step 650), indicating that no collision is probable for the vehicle, the program returns to the beginning (step 642) and reexecutes the program. In some embodiments (not shown), when the trigger signal is not present (step 650) and the vehicle seat 560 is being moved, the vehicle seat is controlled to reverse the vehicle seat electric drives 470, 472, 477, 476 to return the vehicle seat to the starting seat position in a slow mode in a similar manner as at step 646 before returning to the beginning of the program shown in FIG. 10.

When both at least one collision signal and at least one trigger signal are received (steps 644, 650), the vehicle seat control processor 442 compares seat positions with a stored desired seat position for a collision (step 652). Thereafter, the vehicle seat control processor 442 determines whether any of the seat positions for back/forward seat position, up/down seat position, tilt seat position and seat back (angle) position are already at the desired seat position (step 654). When yes, the power for the particular vehicle seat electric drive is discontinued from the vehicle seat controller 440 to stop movement (step 656). In the instance that all of the four seat positions are at the desired seat position, the program ends (step 656). When not all of the seat positions are at the desired seat positions to mitigate a collision, the program executed by the vehicle seat control processor 442 determines a fast mode operation for moving the vehicle seat 560 to the desired seat position. Thus, a polarity, if necessary, for fast mode voltage output is determined for each of the vehicle seat electric drives 470, 472, 474, 476.

The vehicle seat controller 440 then provides power as necessary via selected ones of the power connectors 450, 452, 454, 456 to the vehicle seat electric drives 470 472, 474, 476 to move the vehicle seat 560 to the desired seat position for an imminent collision (step 662). Thereafter, the vehicle seat control processor 442 returns to re-determine a current position of the vehicle seat 560 from changes received from the position sensors 480, 482, 484, 486 of the vehicle seat.

Vehicle Seat Belt Operation

As shown in FIG. 7, the electromotor belt control 438 receives an input or trigger signal from the occupant protection control system 430. In response to the trigger signal indicating an imminent collision, the electromotor belt control 438 outputs power to the seat belt electric drive 478 to tighten or maintain tension of the seat belt of an occupant before a collision occurs. Tightening or tensioning of the seat belt of an occupant occurs only after movement of the vehicle seat 560 is completed.

Thus, the invention provides, among other things, a pre-crash actuator system and method for operating to determine that a collision is imminent and move a vehicle seat to mitigate a collision as to an occupant. Further, a comparison is made of two signals received by the vehicle seat controller or received by a smart control adapter to prevent erroneous movement of the vehicle seat. Various features and advantages of the invention are set forth in the following claims.

What is claimed is:

1. A method for moving a vehicle seat when a collision is probable comprising:
   determining that a collision is probable with an occupant protection control system;
   providing at least one trigger signal and at least one collision signal from the occupant protection control system when a collision is probable;
   in response to receiving the at least one trigger signal and the at least one collision signal by a vehicle seat controller, providing a fast mode voltage from the vehicle seat controller on a power connector to a vehicle seat electric drive for moving the vehicle seat from a starting seat position to a desired seat position to mitigate the severity of a collision on an occupant of the vehicle seat; and
   in response to loss of the collision signal, providing a voltage on the power connector from the vehicle seat controller to the vehicle seat electric drive to return the vehicle seat to the starting seat position,
   wherein the collision signal is provided from the occupant protection control system to the vehicle seat controller on a wire connector, and
   wherein the trigger signal is provided from the occupant protection control system to the vehicle seat controller on a communication bus.

2. The method according to claim 1, wherein the communication bus has a latency.

3. The method according to claim 1, wherein the vehicle seat electric drive is a seat back/forward electric drive and the power connector is a first power connector, and the method further including in response to receiving the at least one trigger signal and the at least one collision signal by the vehicle seat controller,
- providing a fast mode voltage from the vehicle seat controller on a second power connector to a seat up/down electric drive for moving the vehicle seat from the starting seat position to the desired seat position to mitigate the severity of a collision on an occupant of the vehicle seat, and
- providing a fast mode voltage from the vehicle seat controller on a third power connector to a vehicle seat tilt electric drive for moving the vehicle seat from the starting seat position to the desired seat position to mitigate the severity of a collision on an occupant of the vehicle seat.

4. The method according to claim 1, further including:
- at least one seat position sensor providing a seat position signal to the vehicle seat controller, and
- determining a position of the vehicle seat from the seat position signal.

5. The method according to claim 1, wherein the voltage provided on the power connector in response to loss of the collision signal and absence of a collision of the vehicle is a slow mode voltage to return the vehicle seat to the starting seat position.

6. The method according to claim 1, wherein two separate subroutines or programs are executed by the occupant protection control processor to provide the collision signal and the trigger signal separately.

7. The method according to claim 2, wherein the collision signal has a faster response time than the trigger signal due to the latency of the communication bus.

8. The method according to claim 1, including controlling an electromotor belt control connected to the occupant protection control system, the electromotor belt control providing power to a seat belt electric drive for tightening or tensioning of a seat belt of an occupant.

9. The method according to claim 8, wherein the tightening or tensioning of the seat belt of an occupant occurs only after movement of the vehicle seat is completed.

10. The method according to claim 1, wherein the collision signal has a faster response time than the trigger signal.

11. A pre-crash seat actuator system for moving a vehicle seat of a vehicle, comprising:
- a pre-collision sensor unit for sensing objects near the vehicle;
- an occupant protection control system including an occupant protection control processor, the occupant protection control processor configured to:
  - receive inputs from an electronic stability control and the pre-collision sensor unit,
  - use the inputs to determine that a collision is imminent, and
  - when a collision is imminent, provide a collision signal and a trigger signal;
- a vehicle seat controller including a seat control processor, the seat control processor configured to:
  - receive the collision signal over a wire connector,
  - receive the trigger signal on a communication bus,
  - determine a direction and a distance for moving the vehicle seat when a collision is imminent,
  - in response to the trigger signal, provide a fast mode voltage on a power connector to a vehicle seat electric drive for moving the vehicle seat in a fast mode from a starting seat position to a desired seat position to mitigate the severity of a collision on an occupant of the vehicle seat, and
  - in response to loss of the collision signal, providing a voltage on the power connector to the vehicle seat electric drive to return the vehicle seat to the starting position.

12. The system according to claim 11, wherein the communication bus has a latency.

13. The system according to claim 11, wherein the vehicle seat electric drive is a seat back/forward electric drive and the power connector is a first power connector, and
- the vehicle seat controller, in response to receiving the at least one trigger signal and the at least one collision signal,
  - providing a fast mode voltage on a second power connector to a seat up/down electric drive for moving the vehicle seat from the starting seat position to the desired seat position to mitigate the severity of a collision on an occupant of the vehicle seat, and
  - providing a fast mode voltage on a third power connector to a vehicle seat tilt electric drive for moving the vehicle seat from the starting seat position to the desired seat position to mitigate the severity of a collision on an occupant of the vehicle seat.

14. The system according to claim 11, further including:
- at least one seat position sensor providing a seat position signal to the vehicle seat controller, and
- the vehicle seat controller determining a position of the vehicle seat from the seat position signal.

15. The system according to claim 11, wherein two separate subroutines or programs are executed by the occupant protection control processor to provide the collision signal and the trigger signal separately.

16. The system according to claim 12, wherein the collision signal has a faster response time than the trigger signal due to the latency of the communication bus.

17. The system according to claim 11, further including:
- a seat belt drive; and
- an electromotor belt control connected to the occupant protection control system, the electromotor belt control providing power to the seat belt electric drive for tightening or tensioning of a seat belt of an occupant.

18. The method according to claim 17, wherein the tightening or tensioning of the seat belt of an occupant occurs only after movement of the vehicle seat is completed.

* * * * *